United States Patent
Karlsen (10) Patent No.: US 9,465,127 B2
(45) Date of Patent: Oct. 11, 2016

(54) DISPOSABLE ANTIFOULING COVERS FOR GEOPHYSICAL SURVEY EQUIPMENT

(71) Applicant: PGS Geophysical AS, Lysaker (NO)

(72) Inventor: Kenneth Karlsen, Tonsberg (NO)

(73) Assignee: PGS Geophysical AS, Oslo (NO)

( * ) Notice: Subject to any disclaimer, the term of this patent is extended or adjusted under 35 U.S.C. 154(b) by 353 days.

(21) Appl. No.: 14/031,059

(22) Filed: Sep. 19, 2013

(65) Prior Publication Data

US 2014/0334258 A1 Nov. 13, 2014

Related U.S. Application Data

(60) Provisional application No. 61/820,639, filed on May 7, 2013.

(51) Int. Cl.
*G01V 1/38* (2006.01)

(52) U.S. Cl.
CPC ............ *G01V 1/3826* (2013.01); *G01V 1/3843* (2013.01)

(58) Field of Classification Search
CPC ........................ G01V 1/3826; G01V 1/3843
USPC ........................ 73/431; 367/17, 15, 16, 173
See application file for complete search history.

(56) References Cited

U.S. PATENT DOCUMENTS

| | | |
|---|---|---|
| 4,092,858 A | 6/1978 | Ederton |
| 4,751,113 A | 6/1988 | Riccio |
| 4,947,785 A * | 8/1990 | Milne ....................... B63B 5/24 114/357 |
| 4,984,218 A | 1/1991 | Ritter |
| 5,228,005 A | 7/1993 | Bjelland |
| 5,302,414 A | 4/1994 | Alkhimov |
| 5,532,980 A | 7/1996 | Zarate |
| 5,698,283 A * | 12/1997 | Yamasaki ............... B29C 51/14 280/728.3 |
| 5,735,226 A | 4/1998 | McNeal |
| 6,009,042 A | 12/1999 | Workman |
| 7,022,750 B2 | 4/2006 | Camp |
| 7,211,173 B1 | 5/2007 | Staerzl |
| 7,487,840 B2 | 2/2009 | Gammage |
| 7,693,005 B2 | 4/2010 | Stenzel et al. |
| 7,835,222 B2 | 11/2010 | Lobe |
| 8,091,647 B2 | 1/2012 | Nicholson |

(Continued)

FOREIGN PATENT DOCUMENTS

| | | |
|---|---|---|
| EP | 0 465 172 A1 | 8/1992 |
| EP | 2700981 A1 | 2/2014 |

(Continued)

OTHER PUBLICATIONS

Search Report issued by the United Kingdom Intellectual Property Office on patent application GB1407095.7. mailed Oct. 21, 2014, 4 pages.

(Continued)

*Primary Examiner* — Daniel L Murphy (57) ABSTRACT

Disposable antifouling covers for geophysical survey equipment. At least of example embodiments are methods including deploying marine geophysical survey equipment. The deploying may include: installing a disposable antifouling cover of plastic material on a portion of the marine geophysical survey equipment, wherein the disposable antifouling cover occludes a majority of an exterior surface of the portion of the marine geophysical survey equipment; and placing the marine geophysical survey equipment in a body of water.

15 Claims, 8 Drawing Sheets

(56) References Cited

U.S. PATENT DOCUMENTS

| | | |
|---|---|---|
| 8,514,664 B2 | 8/2013 | Harrick |
| 2006/0090593 A1 | 5/2006 | Liu |
| 2006/0144286 A1 | 7/2006 | Baum |
| 2006/0203613 A1 | 9/2006 | Thomsen |
| 2007/0197949 A1* | 8/2007 | Chen .................. C08L 53/02 602/41 |
| 2008/0192569 A1 | 8/2008 | Ray |
| 2009/0097356 A1 | 4/2009 | Haldorsen |
| 2010/0020644 A1 | 1/2010 | Vignaux |
| 2010/0108813 A1 | 5/2010 | Lang |
| 2010/0269731 A1 | 10/2010 | Jespersen |
| 2010/0278011 A1 | 11/2010 | Harrick |
| 2010/0278771 A1 | 11/2010 | Lobe |
| 2011/0123477 A1 | 5/2011 | Mount |
| 2011/0174207 A1 | 7/2011 | Harrick |
| 2011/0255369 A1* | 10/2011 | Harrick .................. G01V 1/201 367/20 |
| 2011/0311769 A1 | 12/2011 | Chen |
| 2012/0243370 A1 | 9/2012 | Vignaux |
| 2012/0250458 A1 | 10/2012 | Tonchia |
| 2012/0301423 A1 | 11/2012 | Chai |
| 2012/0321809 A1 | 12/2012 | Hartshorne |
| 2013/0039153 A1 | 2/2013 | Hartshorne |
| 2013/0142013 A1 | 6/2013 | Hartshorne et al. |
| 2013/0170322 A1 | 7/2013 | Hartshorne et al. |
| 2013/0309017 A1* | 11/2013 | Stenzel .................. B63B 21/66 405/171 |
| 2013/0337201 A1 | 12/2013 | Eyster et al. |
| 2014/0247690 A1 | 9/2014 | Macquin et al. |
| 2014/0272218 A1* | 9/2014 | Thomas .................. D02G 3/38 428/35.1 |

FOREIGN PATENT DOCUMENTS

| | | |
|---|---|---|
| GB | 2 394 479 B | 5/2005 |
| GB | 2502201 A | 11/2013 |
| WO | 89/10947 | 11/1989 |
| WO | 2008/121418 A1 | 10/2008 |

OTHER PUBLICATIONS

P.J. Baum, "Go-faster Strips, Stripes, Riblets, etc.: Speedskating Drag Reduction and the 'Lost Dutchman Olympic Gold Mine'", Arictle, Feb. 14, 1998.

D.W. Bechert et al., "Fluid Mechanics of Bilogical Surfaces and Their Technological Application", 2000, Naturwissenschaften 87:157-171.

William H. Dresher, "Copper in Third-Generation Antifouants for Marine Coatings", Sep. 200, Copper Applications in INdustrial & Marine Applications.

J. Karthikeyan, "Cold Spray Technology: International Status and USA Efforts", Dec. 2004.

(Unknown), "NASA Riblets for Stars & Stripes", Oct. 1993, http://www.nasa.gov/centers/langley/news/factsheets/Riblets_prt.htm (access Nov. 9, 2011).

(Unknown), "Nitto Denko Announces Development of Maringlide Antifouling Protection Film for Marine Applications", Feb. 28, 2013, News Release.

(Unknown), "Shark-Inspired Boat Surfaces", May 1, 2005, http://www.aip.org/dbis/stories/2005/15008.html (accessed Nov. 9, 2011).

\* cited by examiner

DISPOSABLE ANTIFOULING COVERS FOR GEOPHYSICAL SURVEY EQUIPMENT

CROSS-REFERENCE TO RELATED APPLICATIONS

This application claims the benefit of U.S. Provisional Application Ser. No. 61/820,639 filed May 7, 2013 and titled "Disposable Antifouling Covers", which provisional application is incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., ocean, large lakes). Marine geophysical survey systems frequently use a plurality of sensor streamers (long cables), which contain one or more sensors to detect energy emitted by one or more sources. Some marine geophysical survey systems include cables or nodes secured at the bottom of the marine environment. Deployment of sensor streamers and sources often utilizes additional equipment, such as paravanes, lead cables, and lateral or depth control devices.

Any equipment that operates in water, particularly equipment that operates in the ocean in warm equatorial environments, is subject to fouling by various sea creatures, such as barnacles, mussels, oysters, algae, tubeworms, and bacterial slime (collectively referred to as "marine growth"). Marine growth increases weight of equipment, and also increases drag. The additional weight and increased drag may increase fuel cost to tow the equipment through the water, and in some cases may interfere with operation of the equipment itself.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Plastic material" shall mean materials comprising organic polymers, including thermoplastics and thermosetting polymers.

"Chord line" shall mean an imaginary straight line connecting the leading and trailing edges of an object at a particular cross-section of the object.

"Leading edge" shall mean a portion of a piece of equipment that, during towing of the equipment through water during a marine geophysical survey, is the leading portion along the towing direction.

"Latching force" shall mean a force tending to hold two devices in an abutting relationship.

"Marine geophysical survey equipment" shall mean equipment deployed or towed in a body of water during a geophysical survey (e.g., seismic, electromagnetic) of underground formations.

"Disposable cover" and "disposable antifouling cover" shall mean a device that covers or occludes a portion of marine geophysical survey equipment, where the useful life of the disposable cover is less than half the expected useful life of the portion of the marine geophysical survey equipment covered.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The various embodiments are directed to disposable antifouling covers for marine geophysical survey equipment, also referred to herein as "marine geophysical survey devices", or simply "devices". "Disposable" in this context means that the cover has a "limited use", a "limited life", or may be for "single use." That is, a disposable antifouling cover in accordance with the various embodiments is designed and constructed to be used for number of operating hours N, where N is half or less of the number of hours of expected useful life of the portion of the marine geophysical survey equipment covered. Stated alternately, a disposable cover in accordance with various embodiments is designed and constructed such that the cover would not be expected to withstand removal of marine growth from the cover by mechanical means (e.g., power washing, sand blasting); rather, the cover would be disposed of or discarded rather than cleaned. Such a disposable cover would be expected to recognize benefits of single use materials, such as costs savings and weight savings (which translate into drag reduction).

The various embodiments were developed in the context of disposable antifouling covers used on the wings of streamer positioning devices, the antifouling covers used to reduce marine growth on the wings. The example embodiments discussed below are based on the developmental context; however, the developmental context shall not be read to limit the applicability of the methods and systems described. One of ordinary skill, after having read and understood the various embodiments discussed herein, could extend the teachings to other marine geophysical survey equipment. The specification first turns to a description of an example marine surveying system.

Figure 1:
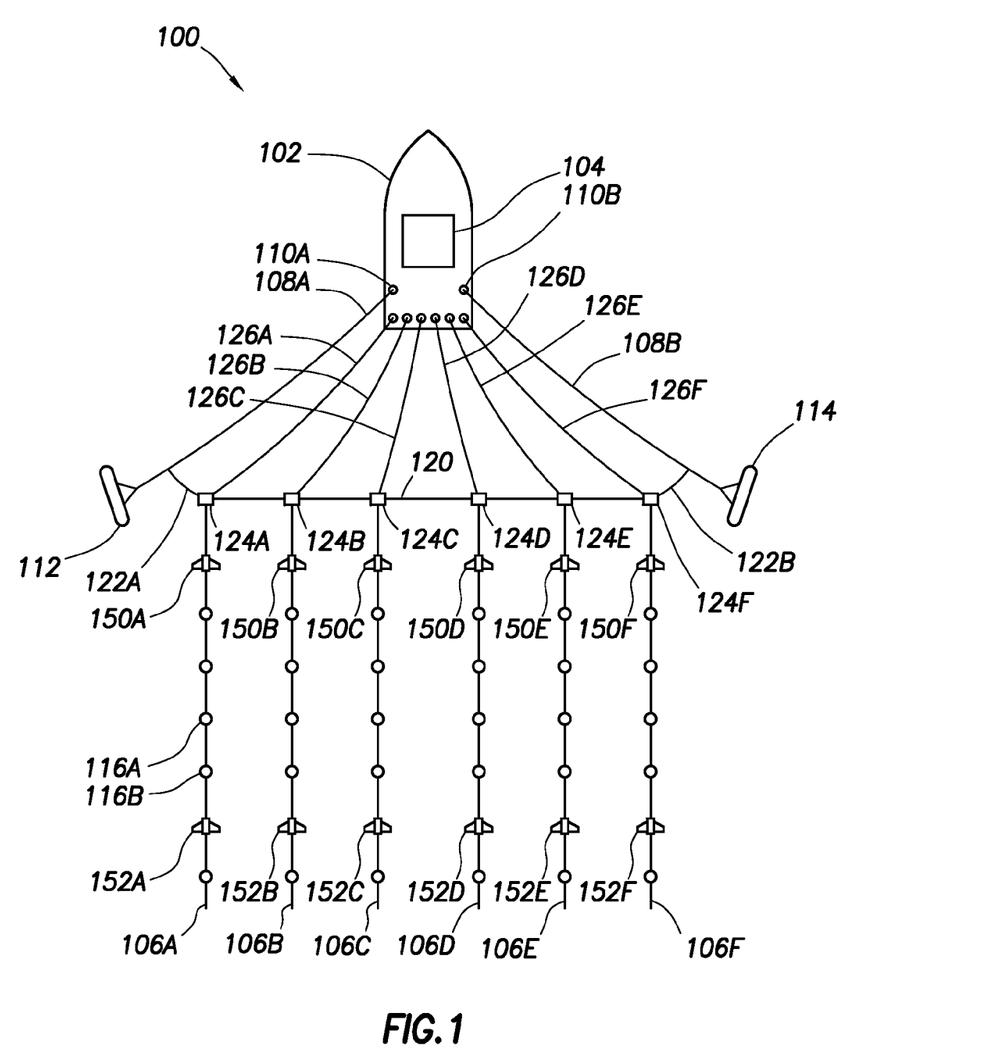
FIG. 1 shows an overhead view of a marine survey system in accordance with at least some embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more streamers 106A-F through the water. While FIG. 1 illustratively shows six streamers 106, any number of streamers 106 may be used. The discussion continues with respect to streamers 106 being sensor streamers, but (for the purpose of this disclosure) streamers 106 are illustrative of any towed geophysical survey cable whether or not the towed geophysical cable is associated with spread line (e.g., transmitter cables, and source cables).

The sensor streamers 106 are coupled to towing equipment that maintains the sensor streamers 106 at selected lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension.

The paravanes 112 and 114 either couple directly to the spreader line 120 or as illustrated couple to the spreader line by way of spur lines 122A and 122B.

The sensor streamers 106 are each coupled, at the ends nearest the vessel 102 (i.e., the proximal ends) to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 116A, 116B) in the streamers 106 may be made using lead-in cables 126A-F. Much like the tow lines 108 associated with respective winches 110, each of the lead-in cables 126 may be deployed by a respective winch or similar spooling device such that the deployed length of each lead-in cable 126 can be changed.

Still referring to FIG. 1, in many cases the sensor streamers 106 will be associated with a plurality of streamer positioning devices. For example, the sensor streamers 106A-F may be associated with streamer positioning devices 150A-F, respectively, shown coupled on proximal end of the sensor streamers. In many cases, the streamer positioning devices 150A-F may provide only depth control, as the lateral spacing of the sensor streamers near the proximal ends may be adequately controlled by the spreader cable 120, and twisting (i.e., rotation about the long axis of the sensor streamer) may not be an issue close to the lead-in cable terminations 124A-F. Further, the sensor streamers 106A-F may be associated with streamer positioning devices 152A-F, respectively, shown coupled further from the proximal ends, and in some cases near the distal ends of the sensor streamers 106A-F. The streamer positioning devices 152A-F may provide not only depth control, but also lateral positional control and may assist in preventing twisting experienced by the sensor streamers. In some cases each sensor streamer 106 may be 1000 to 10000 meters in length, and may comprise 20 or more streamer positioning devices.

Figure 2:
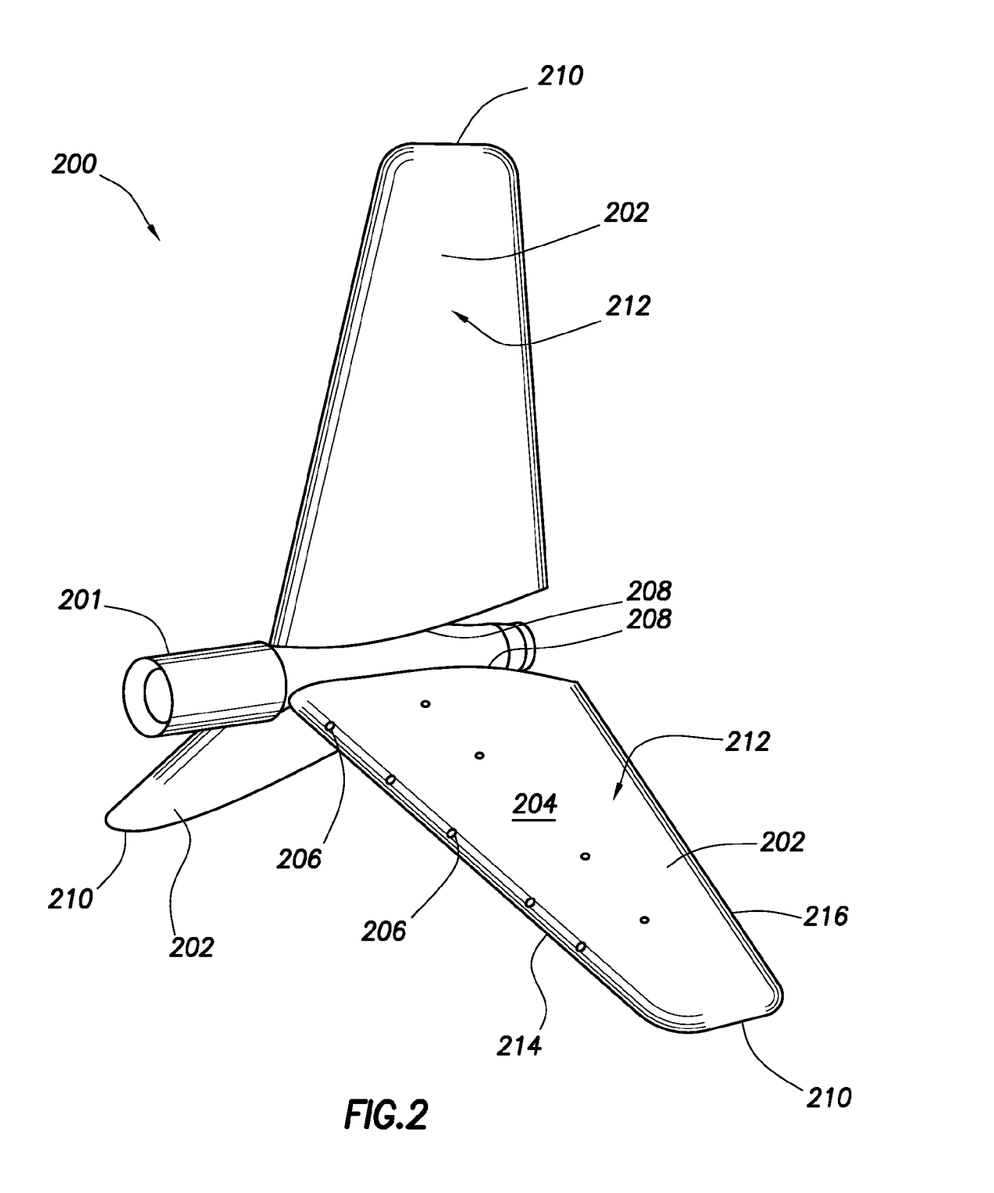
FIG. 2 shows a perspective view of a streamer positioning device in accordance with at least some embodiments.

FIG. 2 shows a streamer positioning device 200 in accordance with at least some embodiments. Streamer positioning device 200 may be illustrative of either streamer positioning device 150A-F or 152A-F, and may be, for example EBIRD® wings available from Kongsberg Maritime AS, Kongsberg Norway. The streamer positioning device 200 comprises a plurality of wings 202 arranged about and extending radially outward from a central chassis 201, which central chassis is designed to couple in series with a sensor streamer 106. The example streamer positioning device 200 is designed to control lateral, vertical, and rotational movement of the sensor streamer 106 by selectively articulating each wing 202 about a respective articulation axis. For streamer positioning devices designed only for depth control, two wings may be used where the wings articulate in unison to provide forces to control or maintain a particular depth. The outer skin 204 of each wing may be secured to a wing sub-chassis (not visible) by one or more fasteners 206, which fasteners may comprise screws, bolts, rivets, or other such fastening devices. Only a small number of fasteners 206 associated with a single wing are shown so as not to unduly complicate the figure; however, each wing may comprise respective fasteners that couple the outer skin to the underlying wing sub-chassis. Each wing 202 comprises a proximal end 208 close to the central chassis 201, and a distal end 210 opposite the proximal end 208. Moreover, each wing may define a cross-sectional shape (taken along a direction of towing) of a symmetrical airfoil, and thus each wing also defines a leading edge 214 and a trailing edge 216.

Each wing comprises an outer surface 212, and the outer surface 212 may be prone to hosting marine growth (e.g., barnacles), particularly on and around the fasteners 206. The marine growth not only adds mass to the wings, but also increases drag and may interfere with articulation of the wings to implement streamer position control. Many sensor streamers 106 may be towed behind a single survey vessel 102, and each sensor streamer 106 may have a plurality of streamer positioning devices, such as devices 150 and 152. The process of removing marine growth from the wings 202 (e.g., power washing, sand blasting) of a correspondingly large number of streamer positioning devices 200 may be both time-consuming and costly.

Figure 3:
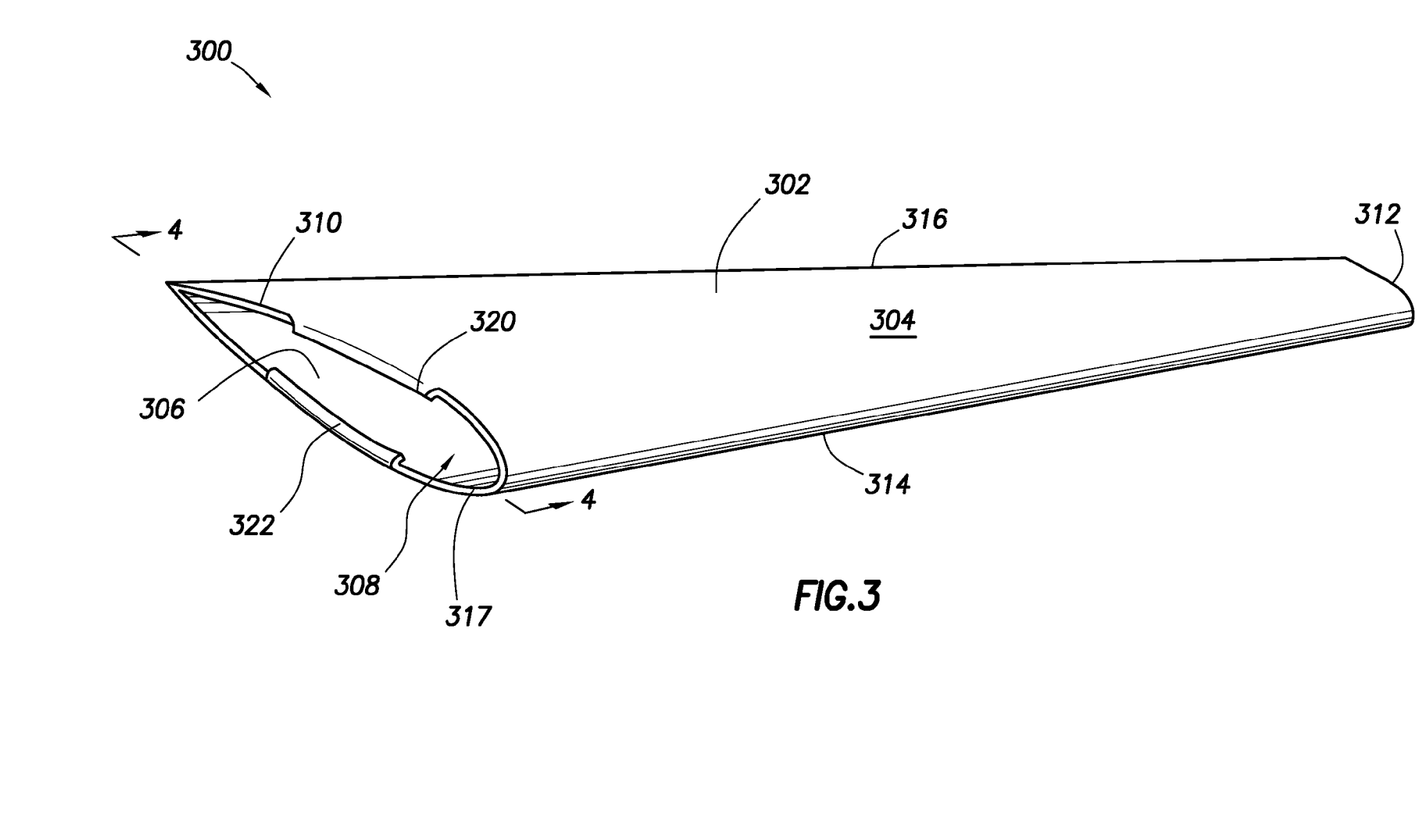
FIG. 3 shows a perspective view of an antifouling cover in accordance with at least some embodiments.

FIG. 3 shows a perspective view of a disposable antifouling cover 300 (hereafter just "antifouling cover 300") in accordance with example embodiments. In particular, the example antifouling cover 300 comprises an elongate body 302 shaped to telescope over and occlude a wing 202 of a streamer positioning device, such as shown in FIG. 2. Thus, the antifouling cover 300 defines an exterior surface 304, an interior surface 306, and an interior volume 308. Much like the wing 202 over which the antifouling cover 300 telescopes, the elongate body defines a proximal end 310, a distal end 312, a leading edge 314, and a trailing edge 316. In many cases, and as shown, the proximal end 310 defines an aperture 317 into the interior volume 308, while the distal end is closed (and thus may be referred to as closed distal end). When the wing 202 over which the antifouling cover 300 will telescope has a cross-sectional shape of a symmetric airfoil, the interior volume 308 will likewise define a symmetric airfoil. In most cases the outer surface 304 will also define a complementary symmetric airfoil when the interior volume 308 defines a symmetric airfoil, but interior cross-section and the exterior cross-section need not correspond in every case.

In accordance with example embodiments, the elongate outer body 302 may also define one or more latching features proximate the aperture 317, with the one or more latching features providing a latching force to hold the antifouling cover 300 on the wing 202 when the antifouling cover 300 is telescoped over the wing 202. In the example antifouling cover of FIG. 3, the one or more latching features comprise a first flange member 320 and a second flange member 322. Each flange member is a portion of the material of the elongate body 302 that is bent or formed to protrude inward relative to the aperture 317. The flange member as a feature providing a latching force is discussed more after a discussion of FIG. 4 regarding terms related to the cross-sectional shape of the antifouling cover 300. In some embodiments, a latching force may be provided or supplemented by static electricity, magnetic, vacuum, or chemical bonding forces.

Figure 4:
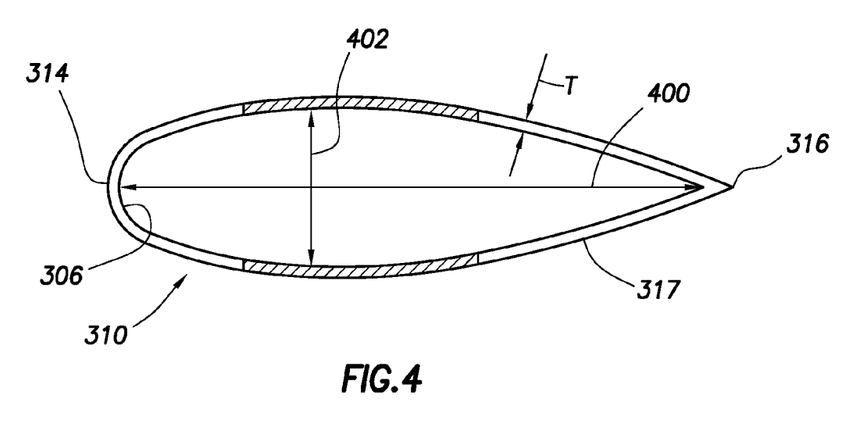
FIG. 4 shows a cross-sectional elevation view of the antifouling cover taken substantially along lines 4-4 of FIG. 3.

FIG. 4 shows a cross-sectional elevation view of an example antifouling cover 300 taken substantially along line 4-4 of FIG. 3. The cross-sectional view is at the aperture 317, and thus the flange members 320 and 322 are cut away and not visible, but the balance of the proximal end 310 of the example antifouling cover is visible. In particular, the aperture 317 defines a plane, which in FIG. 4 corresponds to the plane of the page. A chord line 400 may be conceptually defined, where the chord line resides in the plane defined by the aperture, and where the chord line spans the inside surface 306 between the leading edge 314 and the trailing edge 316. The chord line has a length, and the length may thus be referred to as a chord length. Further, an interior dimension 402 may be defined, where the interior dimension may be measured perpendicular to the chord line 400 and along the plane defined by the aperture 316. In some cases the largest interior dimension may be of interest. The chord length is greater than the largest interior dimension 400, in some cases the chord length is more than twice the largest interior dimension 400, and in yet still further cases the chord length is more than four times the largest interior dimension 400.

Figure 5:
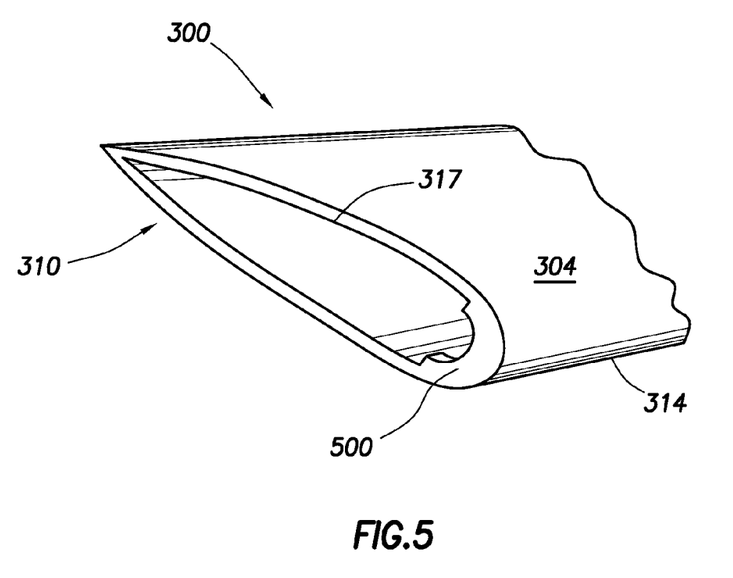
FIG. 5 shows a perspective view a portion of an antifouling cover in accordance with at least some embodiments.

Returning to FIG. 3, the example latching features in the form of flange members 320 and 322 are shown positioned not only at the aperture 317 and protruding inward toward the chord line (not expressly shown in FIG. 3), but in the particular case of FIG. 3 the flange members 320 and 322 intersect the largest interior dimension 402 (not expressly shown in FIG. 3). FIG. 5, however, shows a perspective view of the proximal end 310 of an antifouling cover 300 in accordance with another example embodiment. In particular, the antifouling cover 300 of FIG. 5 comprises a latching feature in the form of the flange member 500, where the flange member 500 is likewise disposed at the aperture 317, but in this case the flange member 500 is disposed at the intersection of the chord line and the leading edge 314. While FIG. 5 shows the flange member 500 used alone, in other cases the flange member 500 may be used in conjunction with one or both of flange member 320 and 322. Before proceeding, it is noted that the flange members 320 and 322 are shown as smoothly varying surfaces to create the inward protrusion, while flange member 500 is shown as a sharp, right angle to create the inward protrusion; however, any inward protruding member, regardless of how smooth or sharp the transition from the outer surface 304 of the elongate body 302 to the inward protrusion, is contemplated.

Figure 6A:
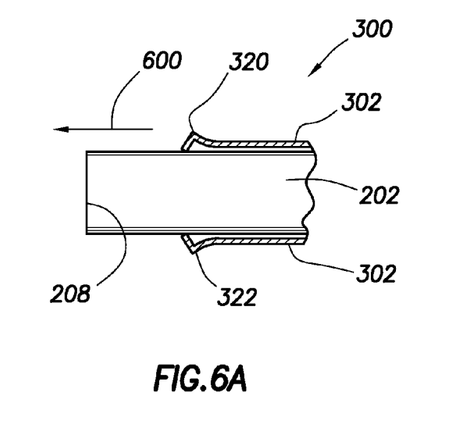
FIG. 6A shows a cross-sectional elevation view of an antifouling cover and a wing during installation of an antifouling cover, in accordance with at least some embodiments.
Figure 6B:
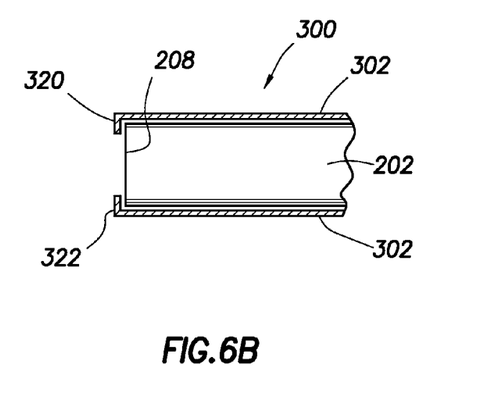
FIG. 6B shows a cross-sectional elevation view of an antifouling cover and a wing once the antifouling cover has been fully telescoped over the wing, in accordance with at least some embodiments.

FIGS. 6A and 6B each show a cross-sectional elevation view of a portion of an antifouling cover 300 telescoped over a wing 202, in each case where flange members are used to provide a latch force to hold the antifouling covers 300 on the wing 202 during use. In particular, FIG. 6A shows a portion of the elongate body 302 partially telescoped over a wing 202. FIG. 6A also shows first flange member 320 and second flange member 322. As the elongate body 302 telescopes onto the wing 202 (in the direction shown by arrow 600), the flange members 320 and 322 are bias outwardly (i.e., away from the internal volume of the antifouling cover 300). However, and now referring to FIG. 6B, once the elongate body 302 telescopes sufficiently onto the wing 202, the bias on the flange members 320 and 322 is released as the flange members 320 and 322 "snap" over the proximal end 208. The flange members 320 and 322 provide a latching force to hold the antifouling cover on the wing. The principle of operation is equally applicable to flange member 500, and so as not to further complicate the specification the biased and non-biased orientation of flange member 500 is not expressly shown. Finally, while separate flange members 320, 322, and 500 are shown and discussed, in yet still other example embodiments a single flange member protruding inward may fully circumscribe the proximal end of the elongate body 302.

Figure 7:
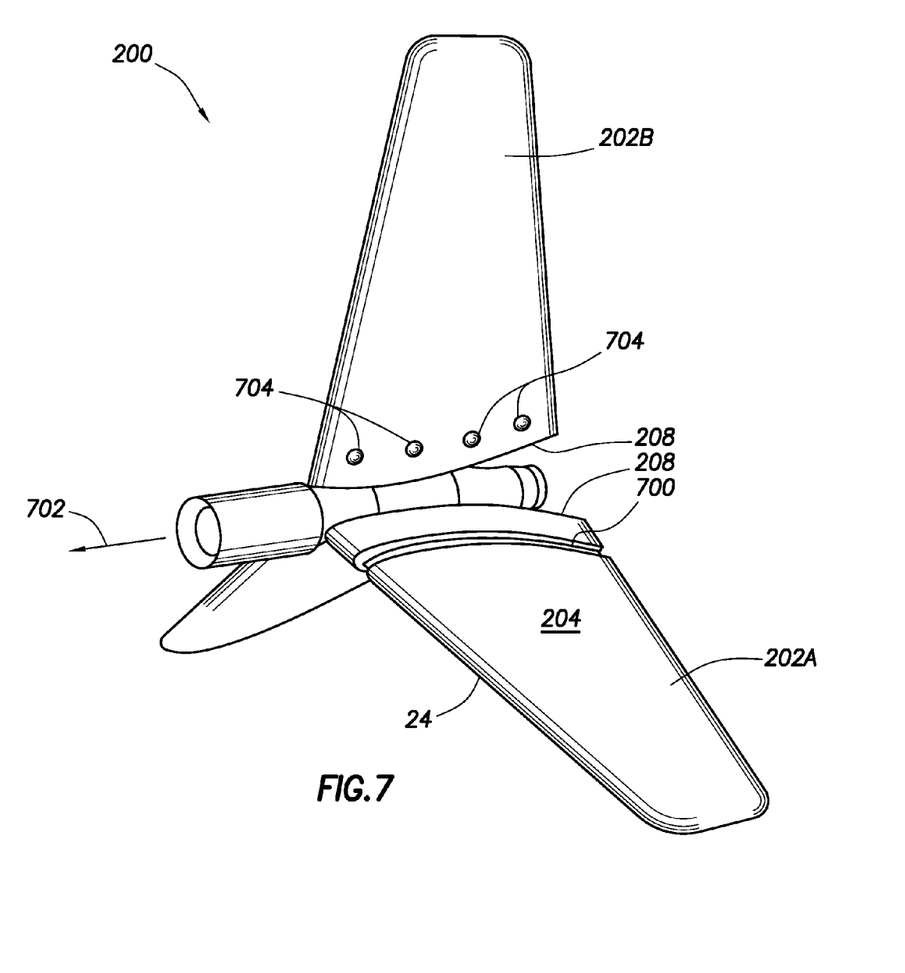
FIG. 7 shows a perspective view of a streamer positioning device in accordance with at least some embodiments.

FIG. 7 shows a perspective view of a streamer positioning device 200 in accordance with yet still further example embodiments. In particular, the wings 202 of the streamer positioning device 200 of FIG. 7 comprise further example features that may assist in providing a latching force for antifouling covers placed over the wings 202. Wing 202A shows a feature in the form of a trough 700 formed in the outer surface 204 of the wing 202, and as shown the trough may circumscribe the entire wing 202A. The size and depth of the trough is exaggerated in FIG. 7 for purposes of clarity. The trough defines a direction that is parallel to a tow direction of the streamer positioning device 200, the tow direction shown by arrow 702. In practice, the depth of the example trough may be a centimeter or less, and in many case three millimeters or less. In other cases, the trough may have a length that less than circumscribes the entire wing 202A (e.g., half way around and including the leading edge 214). In most cases the trough 700 will be near the proximal end 208 of the wing 202A (e.g., within 5 centimeters), but other locations are also contemplated.

Figure 8:
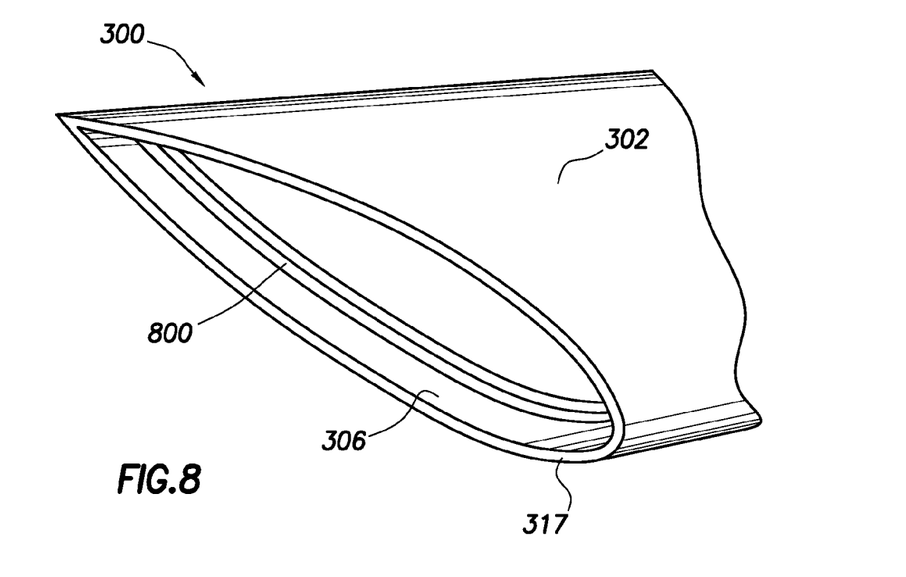
FIG. 8 shows a perspective view a portion of an antifouling cover in accordance with at least some embodiments.

FIG. 8 shows a perspective view of an antifouling cover 300 that works in conjunction with the trough 700. In particular, FIG. 8 shows the elongate outer body 302, aperture 317, and the interior surface 306. Defined on the interior surface 306 is a ridge member 800 having its base on the interior surface 306, and ridge extending inward from the interior surface. Considering together the wing 202A of FIG. 7 and the antifouling cover 300 of the FIG. 8, when the antifouling cover 300 is telescoped over the wing 202A, the ridge 800 snaps into and mates with the trough 700. When the ridge 800 and trough 700 are in an abutting relationship, the ridge 800 and trough 700 provide a force tending to resist movement of the antifouling cover off the wing 202A.

Returning to FIG. 7, FIG. 7 further shows another example feature on the wing that may assist in providing a latching force for antifouling covers. In particular, wing 202B shows a series of indentions 704 formed in the outer surface 204 of the wing 202B. The size and depth of the indentions 704 is exaggerated in FIG. 7 for purposes of clarity. The example indentions may be aligned in a direction that is parallel to a tow direction (again arrow 702) of the streamer positioning device 200. In practice, the depth of each example indention may be a centimeter or less, and in many case three millimeters or less. In most cases the indentions 704 will be near the proximal end 208 of the wing 202B (e.g., within 5 centimeters), but other locations are also contemplated.

Figure 9:
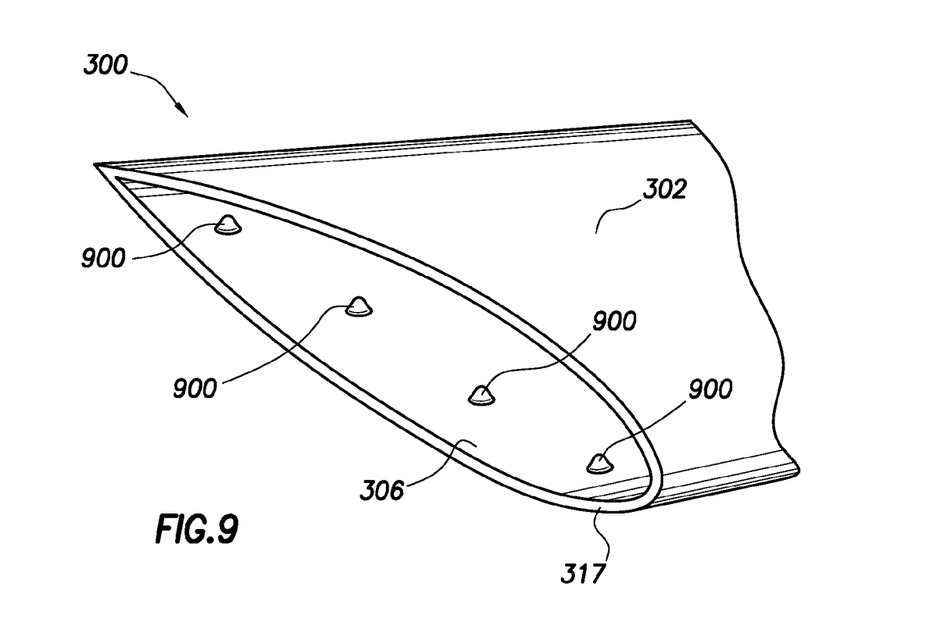
FIG. 9 shows a perspective view a portion of an antifouling cover in accordance with at least some embodiments.

FIG. 9 shows a perspective view of an antifouling cover 300 that works in conjunction with the indentions 704. In particular, FIG. 9 shows the elongate body 302, aperture 316, and the interior surface 306. Defined on the interior surface 306 are a plurality of protrusion members 900, each protrusion member having its base on the interior surface 306 and extending inward from the interior surface. Considering together the wing 202B of FIG. 7 and the antifouling cover 300 the FIG. 9, when the antifouling cover 300 is telescoped over the wing 202B, the protrusions 900 snap into and mate with the respective indentions 704. When the protrusions 900 and indentions 704 are in respective mating relationships, the protrusions 900 and indentions 704 provide a force tending to resist movement of the antifouling cover off the wing 202B.

Before proceeding, it is noted that with respect to FIG. 7, the differing features on wings would likely not be implemented in practice; rather, FIG. 7 is provided as a discussion tool to introduce various features on the wings and antifouling covers that may work together to provide the latching force. In most cases, each wing of a streamer positioning device would be identical, and thus too the antifouling covers would be identical and usable with any wing on a streamer positioning device, and likewise every streamer positioning device of the same type within the entire set of marine geophysical survey equipment.

In order to be installed over and at least partially occlude a wing of a positioning device, the interior surface of an antifouling may define the negative image of the wing. In some cases, the elongate body 302, and in particular the outer surface 304, has a complementary cross-sectional shape that matches the cross-sectional shape of the interior surface. Stated otherwise, in the example situation the interior surface may define a negative image of the underlying device, and the outer surface may define "positive" or duplicate image of the underlying device. Thus, because of the symmetry between the inner and outer shapes, a number of the antifouling covers 300 may be "stacked" together in an abutting relationship to reduce the space needed to store and transport a large number of antifouling covers. In the example case of antifouling covers 302 for wings of a positioning device, the covers may be "stacked" by telescoping a plurality of antifouling covers together.

The example antifouling covers may be manufactured from any suitable neutrally- or positively-buoyant material. For example, the antifouling covers may be made from plastic materials such as high-density polyethylene (HDPE), low-density polyethylene (LDPE), polyethylene terephthalate (PET), and other similar materials. In some cases, the antifouling covers may be manufactured using a vacuum forming method to reduce cost and enable large-scale production. In other cases, the antifouling covers may be made by injection molding processes. When made from a plastic material, the elongate outer body (e.g., elongate outer body 302) may have a thickness T (FIG. 4) of one millimeter or less. In yet still further cases, the antifouling covers may be made from a negatively-buoyant material such as aluminum or titanium.

In another embodiment, the example antifouling cover 300 may comprise a deformable or shrinkable section such that the antifouling cover 300 (when installed over a wing) engages the wing 202 with sufficient friction to prevent the antifouling cover 300 from becoming decoupled from the wing 202 as a result of hydrodynamic drag caused by towing the streamer positioning device 200 through a marine environment. Deformability may take many forms. For example, the deformable section may be activated by heat or electromagnetic radiation (e.g., ultraviolet light). In other cases, the deformable section may be activated by application of a chemical which invokes a chemical reaction that shrinks the deformable section. In still other cases, the deformable section may coincide with the location of flanges 320, 322, or 500, or may coincide with the location of the ridge 800 or protrusions 900, such that once the example feature are interlocked with the wing 202 by deformation, further latch force may be created by shrinking the antifouling cover in place at the location of the features.

In some embodiments, the exterior surface 304 conforms to the interior surface 306 of the antifouling cover 300 such that any indentions presenting the outer skin 204 of the wing 202 would be evident on the exterior surface 306 of the antifouling cover 300. The presence of such indention in the outer surface 306 matching indention in the outer skin 204 might be particularly prevalent in cases where the antifouling cover 300 is deformable as discussed in the immediately preceding paragraph.

Prior to use of the example streamer positioning device 200, an antifouling cover may be placed on each wing 202. The streamer positioning device may be thereafter used in a marine environment with the marine growth occurring on the antifouling cover 300 rather than the outer surface 212 of the wings 202. When the volume of marine growth on the antifouling cover reaches a certain point (e.g., volume of marine growth, mass of marine growth, amount of additional drag created by the marine growth), the antifouling cover 300 may be easily removed by an operator and replaced with a new antifouling cover 300. Thus, antifouling cover 300 reduces the cost and complexity of removing marine growth from streamer positioning devices 200.

Additionally, while the ease of removal, disposability, and/or recyclable nature of the antifouling covers reduce the cost and complexity of removing marine growth from marine geophysical survey equipment, the antifouling covers themselves may be designed to be more resistant to marine growth or build-up. In particular, marine growth is more prevalent in areas where a high amount of turbulence is present. Thus, in at least some embodiments, the exterior surface of the example antifouling cover 300 designed to reduce turbulence. In some embodiments, the exterior surface of the example antifouling cover 300 may be substantially smooth. In some cases, substantially smooth may refer to a surface having features no larger than 1 millimeter, one-tenth of 1 millimeter, or one-hundredth of 1 millimeter. In other embodiments, the exterior surface of the antifouling cover 300 comprises a micro-texture designed to reduce hydrodynamic drag (e.g., riblets, dimples, or a "shark skin" pattern). Antifouling covers so designed may be less susceptible to marine growth because of the substantially smooth outer surface and also reduces marine growth marine geophysical survey equipment by occluding the fasteners and other textured surfaces.

Further, in some embodiments, a treatment may be applied to the antifouling covers to further reduce the chances of marine growth or build up. For example, a special antifouling coating (e.g., a paint containing copper powder) may be applied to the exterior of the antifouling covers. In some cases, the antifouling coating may be applied to the antifouling covers just before or just after the antifouling covers are installed on the marine geophysical equipment. However, in other cases the antifouling coating may be applied well in advance, such as when the antifouling covers are manufactured. Alternately or additionally, an antifouling agent may be included in the material (e.g., HDPE) from which the antifouling cover 300 is manufactured. In this way, marine growth on the surface of the antifouling cover 300 is further limited.

Figure 10:
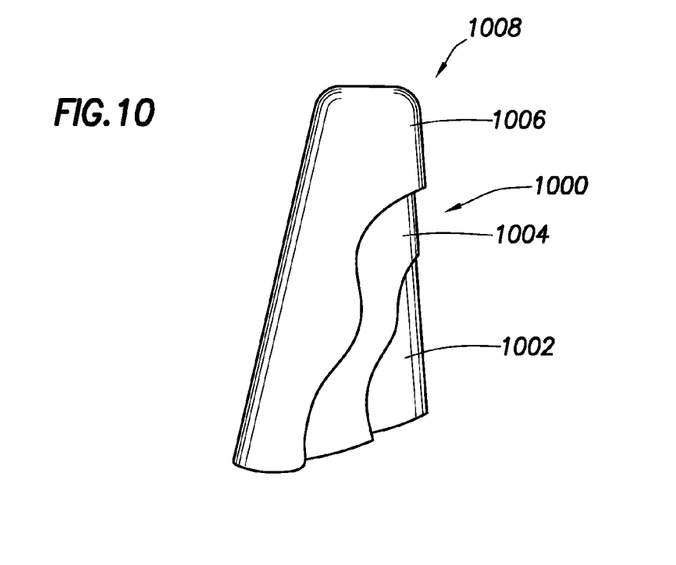
FIG. 10 shows a perspective, partial cut-away, view of wing with a cover system in accordance with at least some embodiments.

In yet still other example embodiments, multiple antifouling covers may be used with the single piece of marine geophysical survey equipment. FIG. 10 shows a perspective, partial cut-away, view of wing in accordance with the further example embodiments. In particular, FIG. 10 shows a wing 1000 (and only a portion of the outer skin 1002 is visible). Telescoped over the wing 1000 is a first antifouling cover 1004. The first antifouling cover may couple to the wing 1000 by way of any mechanism previously discussed. Moreover, the example system further comprises a second antifouling 1006 telescoped over the first antifouling cover 1004 (and thus telescoped over the wing 1000). The second antifouling cover 1006 may couple to the underlying antifouling cover 1004 (and thus the wing 1000) by way of any mechanism previously discussed. Thus, the first and second antifouling covers may be considered a cover system 1008, and while two antifouling covers 1004 and 1006 are expressly discussed as part of the cover system 1008, two or more antifouling convers may be used in the cover system 1008. In some cases no more than three antifouling covers may be initially implemented in the cover system 1008.

The example antifouling covers 1004 and 1006 may be installed sequentially (first the antifouling cover 1004, and then the antifouling cover 1006), or the antifouling covers may be simultaneously telescoped over the wing 1000. In the simultaneous case, the second antifouling cover 1006 may be telescoped over the first antifouling cover 1004 in advance of the installation (e.g., during manufacturing, on the deployment vessel). In the example cover system 1008, each antifouling cover may be slightly larger than the antifouling cover beneath, such that each successive outer antifouling cover fully occludes the antifouling cover beneath. In other cases, the antifouling covers may be structurally the same size, and thus while each successive outer antifouling cover may substantially occlude the under the antifouling cover, slight exposure of the underlying cover is possible. Thus, the cover system 1008 may have stacked configuration similar to the stacked configuration for storage and transportation discussed above.

In operation, the cover system 108 may be used within a marine geophysical survey, and when the marine growth on the outermost antifouling cover exceeds a predetermined threshold, then the outermost antifouling cover may be removed (e.g., by a work boat while the positioning device is still in the water), thus exposing the next underlying antifouling cover.

Figure 11:
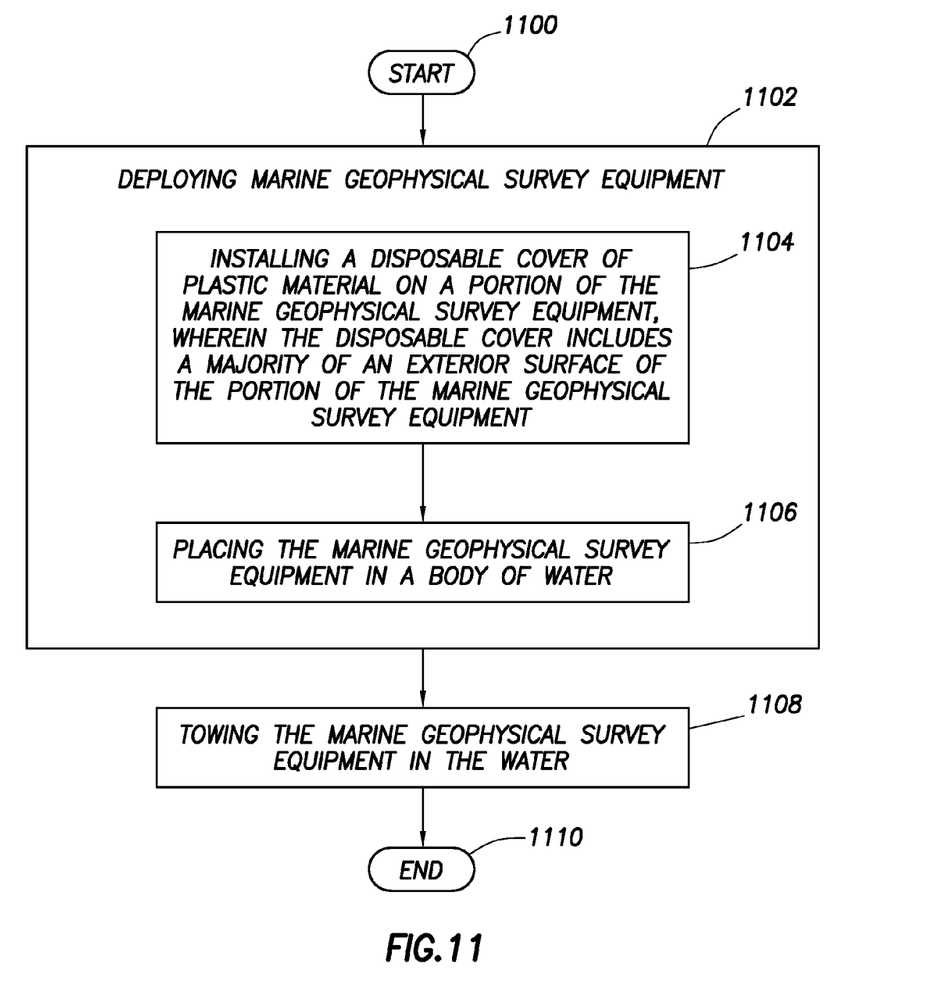
FIG. 11 shows a block diagram of a method in accordance with at least some embodiments.

FIG. 11 shows a method in accordance with example embodiments. In particular, the method starts (block 1100) and comprises deploying marine geophysical survey equipment (block 1102). The deploying may comprise: installing a disposable antifouling cover of plastic material on a portion of the marine geophysical survey equipment, wherein the disposable cover occludes a majority of an exterior surface of the portion of the marine geophysical survey equipment (block 1104); and placing the marine geophysical survey equipment in a body of water (block 1106). That is, in some cases the disposable covers of plastic material may be installed before placing marine geophysical survey equipment in the water. In other cases, the disposable covers of plastic material may be installed after the marine geophysical survey equipment is already in the water, the installation by separate work boat, for example. In some embodiments, deploying may also comprise applying a treatment to the disposable cover to further reduce the chances of marine growth or build up. The example method may further include towing the marine geophysical survey equipment (block 1008). In some cases, the marine geophysical survey equipment will be secured at a location in the body of water. Thereafter, the method ends (block 1110).

Figure 12:
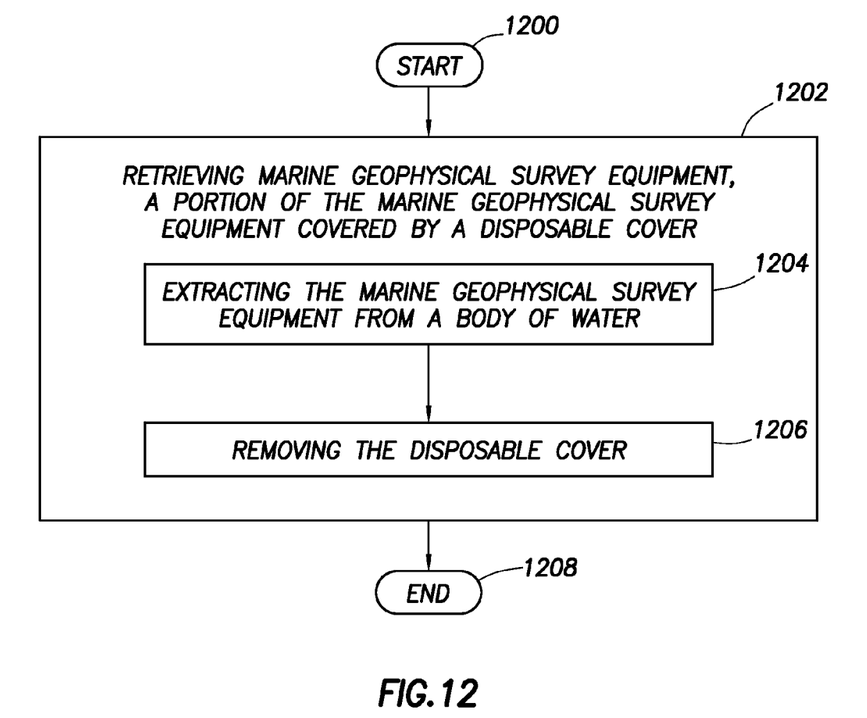
FIG. 12 shows a block diagram of a method in accordance with at least some embodiments.

FIG. 12 shows a method in accordance with example embodiments. In particular, the method starts (block 1200) and comprises retrieving marine geophysical survey equipment, wherein a portion of the marine geophysical survey equipment is covered by a disposable antifouling cover (block 1202). The retrieving may comprise: extracting the marine geophysical survey equipment from a body of water (block 1204); and removing the disposable cover (block 1206). Removing the cover (again block 1206) may take place on the deck of vessel retrieving the marine geophysical survey equipment. In other cases, the removing of the cover may take place while the marine geophysical survey equipment, or portion thereof, is still in the water, for example, by way of a work boat, where the work boat is distinct from the vessel onto which the marine geophysical survey equipment is retrieved. Moreover, removing may comprise dislodging any of a plurality of features of the disposable cover. For example, dislodging may comprise dislodging a flange member, dislodging a protrusion defined on an interior surface of the cover, or dislodging a ridge defined on an interior surface of the cover. In the case of a shrinkable portion of the disposable antifouling cover, removing may comprise cutting, ripping, unwrapping, chemical peel, air injection, or expansion. Moreover, in most cases the retrieving step is repeated for portion of the marine geophysical survey equipment on which a disposable cover has been placed. Thereafter, the method ends (block 1208).

In some embodiments, the methods of FIGS. 11 and 12 may be combined. For example, when multiple antifouling covers are used with the single piece of marine geophysical survey equipment, removal of an outer-most cover may be immediately followed by re-deployment of the marine geophysical survey equipment. Removal of the outer-most cover might also be immediately followed application of a treatment to the next-outer-most cover to further reduce the chances of marine growth or build up, and then subsequently followed by re-deployment of the marine geophysical survey equipment.

References to "one embodiment," "an embodiment," "a particular embodiment," and "some embodiments" indicate that a particular element or characteristic is included in at least one embodiment of the invention. Although the phrases "in one embodiment," "an embodiment," "a particular embodiment," and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each sensor streamer 106 may comprise multiple individual sections electrically and mechanically coupled end-to-end to form each overall streamer 106. As another example, although explained generally with respect to a wing of a streamer positioning device, the antifouling cover may be adapted for any marine geophysical survey device where marine growth or build up is desired to be reduced or avoided. It is intended that the following claims be interpreted to embrace all such variations and modifications.

What is claimed is:

1. A disposable antifouling cover for use with marine geophysical survey equipment, the disposable antifouling cover comprising:
   a first elongate body of plastic material configured to occlude a majority of an exterior surface of a portion of the marine geophysical survey equipment, wherein the body of plastic material comprises:
      a leading edge and an opposite trailing edge defined by the elongate body,
      an exterior surface,
      an interior surface, wherein the interior surface defines a negative image of a positioning device of the marine geophysical survey equipment,
      an interior volume, and
      a proximal end defined by the elongate body, the proximal end comprising an aperture into the interior volume.

2. The disposable antifouling cover of claim 1 wherein the elongate body defines the negative image of a wing of a positioning device.

3. The disposable antifouling cover of claim 1 wherein the exterior surface and the interior surface define complementary shapes such that the disposable antifouling cover is stackable by placing the disposable antifouling cover in an abutting relationship with another disposable antifouling cover.

4. The disposable antifouling cover of claim 1 wherein the exterior surface and the interior surface define complementary shapes such that the disposable antifouling cover is stackable by telescoping the disposable antifouling cover into another disposable antifouling cover.

5. The disposable antifouling cover of claim 1 further comprising a second elongate body of thin plastic material that defines an exterior surface, an interior surface, and an interior volume, the interior surface of the second elongate body defines a negative image of the portion of the marine geophysical survey equipment, and the second elongate body within and abutting the first elongate body.

6. The disposable antifouling cover of claim 1 further comprising a coating on the exterior surface configured to reduce marine growth on the exterior surface.

7. The disposable antifouling cover of claim 1 further comprising a latch feature defined by the elongate body proximate the aperture, the feature configured to provide a latch force when the disposable antifouling cover is installed on the portion of the marine geophysical survey equipment.

8. The disposable antifouling cover of claim 7 wherein the latch feature further comprises at least one selected from the group consisting of: a first flange member defined at the aperture, where the first flange member protrudes inward relative to the aperture; a protrusion defined on the interior surface; and a ridge defined on the interior surface.

9. The disposable antifouling cover of claim 1 wherein the thin plastic material has a thickness of one millimeter or less.

10. The disposable antifouling cover of claim 1 wherein the exterior surface further comprises at least one selected from the group consisting of: features no larger than 1 millimeter; features no larger than 0.1 millimeter; have features no larger than 0.01 millimeter; have micro-texture that reduces hydrodynamic drag; an anti-fouling coating.

11. The disposable antifouling cover of claim 1 wherein the disposable antifouling cover further comprises a deformable section configured to deform to provide a latching force to hold the disposable antifouling cover on the portion of the marine geophysical survey equipment.

12. The disposable antifouling cover of claim 1 wherein the deformable section comprises at least one selected from the group consisting of: a heat shrinkable section; a chemically shrinkable section; and an electromagnetic radiation shrinkable section.

13. A disposable antifouling cover for use with marine geophysical survey equipment, the disposable antifouling cover comprising:
   a first elongate body of plastic material configured to occlude a majority of an exterior surface of a portion of the marine geophysical survey equipment, wherein the body of plastic material comprises:
      a leading edge and an opposite trailing edge defined by the elongate body,
      an exterior surface,
      an interior surface, wherein the interior surface defines a negative image of a portion of the marine geophysical survey equipment,
      an interior volume,
      a proximal end defined by the elongate body, the proximal end comprising an aperture into the interior volume, and
      a latch feature defined by the elongate body proximate the aperture, the feature configured to provide a latch force when the disposable antifouling cover is installed on the portion of the marine geophysical survey equipment.

14. The disposable antifouling cover of claim 13 wherein the latch feature further comprises at least one selected from the group consisting of: a first flange member defined at the aperture, where the first flange member protrudes inward relative to the aperture; a protrusion defined on the interior surface; and a ridge defined on the interior surface.

15. A disposable antifouling cover for use with marine geophysical survey equipment, the disposable antifouling cover comprising:
   a first elongate body of plastic material configured to occlude a majority of an exterior surface of a portion of the marine geophysical survey equipment, wherein the body of plastic material comprises:
      a leading edge and an opposite trailing edge defined by the elongate body,
      an exterior surface,
      an interior surface, wherein the interior surface defines a negative image of a wing of a positioning device of the marine geophysical survey equipment,
      an interior volume, and
      a proximal end defined by the elongate body, the proximal end comprising an aperture into the interior volume.

* * * * *